United States Patent [19]

Borrel et al.

[11] 3,714,007

[45] Jan. 30, 1973

[54] PROCESS FOR PHOTOPOLYMERIZING UNSATURATED POLYESTER RESINS IN CONTACT WITH IMMISCIBLE LIQUIDS

[75] Inventors: Philippe Borrel; Jean Lehureau, both of Lyon, France

[73] Assignee: Progil, Paris, France

[22] Filed: Dec. 1, 1970

[21] Appl. No.: 94,159

[30] Foreign Application Priority Data

Dec. 17, 1969 France................................6943624

[52] U.S. Cl. ..........204/159.15, 117/93.31, 117/148, 156/272, 161/195, 204/159.19, 260/40 R
[51] Int. Cl. ..............................C08d 1/00, C08f 1/16

[58] Field of Search....204/159.15, 159.23, 162, 158, 204/159.14, 159.19

[56] References Cited

UNITED STATES PATENTS

| 3,515,657 | 6/1970 | Nakanome et al. | 204/159.24 |
| 3,582,487 | 6/1971 | Fuhr et al. | 204/159.15 |
| 3,554,887 | 1/1971 | Feehs | 204/158.4 A |

Primary Examiner—Murray Tillman
Assistant Examiner—Richard B. Turer
Attorney—Browdy & Neimark

[57] ABSTRACT

Photopolymerization of unsaturated polyester resins is carried out by submerging the resin beneath a clear liquid which provides a better heat balance.

3 Claims, No Drawings

PROCESS FOR PHOTOPOLYMERIZING UNSATURATED POLYESTER RESINS IN CONTACT WITH IMMISCIBLE LIQUIDS

The present invention relates to a new process for photopolymerizing unsaturated polyester resins in the form of varnishes, coatings and ply-structures or laminates with reinforcing fibers.

The polymerization of polyester resins is well known and can be effected: (1) by the addition of substances generating free radicals such as peroxides or azo derivatives followed by heating; or (2) by the addition of metal accelerators to the peroxide, thereby allowing the polymerization to be carried out under ambient conditions.

The photopolymerization of polyester resins has also been long carried out in the presence of a photoinitiator which is added to the resin. Numerous compounds have been used for this purpose (Mac Closkey and Bond-Industrial and Engineering Chemistry — October, 1955 — pages 2125-2128).

The manufacture of reinforced plastics laminates by photopolymerization at ordinary temperature, under ultraviolet ray lamps and in the presence of an initiator, of laminated layers of fibers or glass fabrics impregnated with unsaturated polyester resin (J. Kaminctsky et al. — Plastics Technology — pages 39-46 — June, 1961) has also been described.

The polymerization or photopolymerization reaction takes place under exothermic conditions which necessitate the continuous removal of the heat which is liberated. On account of the viscosity and the poor heat conductivity of the resin, this liberation of heat cannot take place in a constant and uniform manner in the various known polymerization methods which are used. More or less localized areas of over-heating arise, which are detrimental to the polymerized product, both as regards its appearance and the constancy of its mechanical properties, and, in the case of laminates, as regards the resin-reinforcing fiber cohesion, which influences the transparency.

In order to avoid these disadvantages, an attempt must be made to spread the liberation of heat over the reaction time, without however significantly increasing the normal duration of polymerization.

This result has now been obtained by using a particular photopolymerization technique, which is the subject of the present invention. It has, in fact, surprisingly been discovered that the photopolymerization of unsaturated polyester resins, kept immersed in a liquid medium, leads to a polymer product having an improved appearance, better mechanical properties and, in the case of ply-structures or laminates, a better fiber-resin adhesion and a high transparency.

The immersion of the resin in a liquid which acts as a heat exchange chamber allows the exothermic heat to be removed constantly and uniformly, and thus avoids the localized areas of overheating which are detrimental to the overall properties of the product.

The choice of the liquid is a function of the usage. Such liquid must always be transparent to light radiations, at the wavelengths appropriate to each initiator, and must have a suitable density so as to allow the product to be kept easily immersed.

Water, mineral oils (paraffin, "Vaseline," liquid petrolatum and the like), or vegetable oils with a low degree of unsaturation (stearin, palmitin, and the like), may be cited among the liquids which can be used. Organic solvents, carefully chosen as a function of their boiling point and used along or as a mixture, can be employed, the heat liberated serving to volatilize them. For example, methyl or ethyl alcohol, methylene chloride, carbon tetrachloride and monochlorobenzene, are particularly suitable.

If required, these liquids can contain additives, in the dissolved or finely dispersed state, which are able to act as light filters stopping the infra-red and visible radiations, which are useless in the photopolymerization process. Thus, for example, methylene blue or any other blue dyestuff can be added to the liquids.

The polyester resin, diluted with the cross-linking monomer, can be brought into direct contact with the liquid if such liquid is immiscible with the diluted resin or, in the case when they are miscible, the resin can be separated from the liquid by a thin, flexible or rigid membrane which is transparent to the light radiations and is inert to the various products present. Terephthalate polyester membranes (such as "Mylar"), cellophane membranes and polyethylene and rubber membranes, and the like, may, for example, be mentioned.

Any unsaturated polyester resin of known type can be used for carrying out the invention, that is to say polycondensates of unsaturated diacids or anhydrides, such as maleic anhydride, maleic acid, or fumaric acid, which can contain saturated anhydrides or acids, such as the various phthalic acids, sebacic acid, adipic acid and the like, with a diol such as ethylene glycol, propylene glycol, diethylene glycol, a chlorinated diol and the like, diluted with a polymerizable ethylenic monomer or mixture of polymerizable ethylenic monomers, such as styrene, vinyl acetate, or an acrylic or allyl compound or the like. The content of polymerizable monomer, relative to the resin, can vary from 25 to 70 percent by weight. This resin in most cases contains conventional stabilizers, such as hydroquinone or its ethers.

The resin of unsaturated polyesters is mixed with an amount of a polymerization photo-initiator which is generally between 0.01 and 10 percent of its weight, preferably 0.05 to 2 percent. Among the initiators of known type, there may be mentioned, for example: diacetyl, dibenzoyl, benzophenone, or, preferably, benzoin or an alkyl ether or benzoin, such as, for example, the methyl, ethyl or propyl ethers of benzoin.

Furthermore, it is not incompatible with the technique according to the invention to add radical polymerization initiators of known type, such as azobisisobutyronitrile, in an appropriate amount, or organic peroxides such as benzoyl peroxide, cyclohexanone peroxide and the like, to the resin.

The reinforcing fibers which can be used when manufacturing ply-structures or laminates can be glass fibers, asbestos fibers, sisal or other organic fibers, carbon fibers or mono-crystalline fibers called "wiskers," and the like, which can be in any of the forms well known in the technology, that is to say in the form of continuous filaments, fabrics, felts, or mats of chopped fibers. The resin content in the fiber-resin mixture is usually regulated to be between 20 and 90 percent, and more particularly between 50 and 80 percent, by weight.

The wavelengths of the ultra-violet radiations generally employed are between 1500 and 5000 Angstroms, more particularly between 3000 and 4000 Angstroms.

This technique of photopolymerization according to the invention can be used as a continuous or discontinuous process in the various applications in question.

The following examples show how the invention can be carried out in practice.

EXAMPLE 1

An unsaturated polyester resin was prepared by diluting 59 parts by weight of a polycondensate of 1 mol. of phthalic anhydride and 1 mol of maleic anhydride with 2.2 mols of propylene glycol, in 41 parts by weight of styrene. The resin was mixed with 0.01 percent of hydroquinone as stabilizer, and with 0.1 percent of the ethyl ether of benzoin, as a photo-initiator. This mixture was used to impregnate a 450 g/m$^2$ glass fiber mat, so that a weight ratio of glass/resin of 1/3 was obtained.

The impregnated mat was placed between 2 sheets of Mylar (registered trademark) and the whole assembly was placed in a porcelain dish. The assembly was then subjected to light irradiation from Philips, HT Q.4, 1 kilowatt, lamps, at a wavelength of 3600 Angstroms. The distance of the object from the light source was 40 cm.

The following comparative tests were carried out:
1. Polymerization in an empty, white porcelain dish.
2. Polymerization in a white porcelain dish filled with cold water.
3. Polymerization in a white porcelain dish filled with hot water at 60° C.
4. Polymerization in a white porcelain dish filled with a cold aqueous solution containing 0.1 percent of methylene blue.

The table below sets out the polymerization conditions and the results obtained.

| Polymerization time | | Temp. in the laminate at the end of the polymerization | Appearance of the laminate | Tensile strength |
|---|---|---|---|---|
| 1 | 8 minutes | 130°C. | white glass fibers visible | 500 kg/cm$^2$ |
| 2 | 11 minutes | 60°C. | translucent | 700 kg/cm$^2$ |
| 3 | 8 minutes | 68°C. | translucent | 650 kg/cm$^2$ |
| 4 | 8 minutes | 70°C. | translucent | 650 kg/cm$^2$ |

The laminate obtained without immersion in water showed high stresses visible in polarized light.

The three other laminates did not show any stress.

The fact that the first laminate, made without immersion in water, shows visible white fibers, indicates a lack of cohesion between the fiber and the resin. This deficiency does not appear in the laminates obtained, with immersion in water. Moreover, the latter exhibit better mechanical properties. The use of hot water instead of cold water permits more rapid polymerization, combined with a slight decrease in the tensile strength. The presence of methylene blue causes the immersion bath to be heated up rapidly by the absorbed radiations, and leads to the same results as those obtained using hot water.

This process of manufacturing a laminate can be carried out continuously or discontinuously, according to traditional techniques. The process may be carried out, for example, according to the technique defined by the Applicant Company in copending application Ser. No. 45,007 filed June 10, 1970. According to technique, the resin-glass fiber assembly is exposed to light radiations in two successive stages, the first consisting of an intense and brief irradiation intended to cause a rapid gelling of the surface, while the second irradiation is longer, but less intense, and allows the laminate to be cured.

EXAMPLE 2

To the resin used as a starting material in Example 1 was added 2 percent of the ethyl ether of benzoin. The product obtained was deposited on plywood sheets in the form of a uniform layer 0.5 mm thick. A first sheet was exposed to the radiations from a Phillips, HT Q.4, 1 kilowatt, lamp, placed at a distance of 40 centimeters. Polymerization was effected in 2 minutes. A second sheet was kept immersed in vaseline oil, and subjected to the same light intensity for the same time, and at the same distance.

The sheet which was cured in air showed numerous occluded bubbles in the varnish and a soft surface which was difficult to polish when dry. The sheet cured under oil did not show any bubbles, and had a hard surface.

The polyester resin used was also mixed with 0.01 percent by weight of paraffin, and then placed on plywood, according to the so-called "paraffin varnish" technique. These sheets, which were photopolymerized without immersion, showed a hard, matte surface which was easy to polish, but the varnish still contained bubbles, especially if the plywood was of a dark color. While paraffin varnishes showing no occluded bubbles can be photopolymerized without immersion by reducing the light intensity, the duration of polymerization required unfavorably rises from 2 to 10 minutes in such a case.

EXAMPLE 3

A hemispherical cup, serving as a glass mold, is coated with an aqueous solution of polyvinyl alcohol, in order to facilitate mold release, which is then dried. This cup is lined with a glass mat impregnated, as in example 1, with the same polyester resin mixed with 0.1 percent of the ethyl ether of benzoin, according to the known principle of contact molding. The polyester resin is subjected to radiation from a Philips, HT Q.4, 1 kilowatt, lamp, placed at a distance of 40 centimeters. The polymerization is effected in 8 minutes.

A second cup, covered with the same mat impregnated with the same resin, is filled with water and subjected to the same radiation, at the same distance, and for the same time.

A third cup, again coated with the same materials, is covered with a transparent elastic rubber sheet. A vacuum is then applied between the rubber and the resin, in order to cause the latter to lie against the mat impregnated with resin, according to the so-called vacuum bag technique. The assembly is then subjected to the same radiation, at the same distance and for the same time.

A fourth cup, prepared like the third and covered with an identical elastic sheet, but without applying a vacuum is filled with water, which allows the sheet to lie against the mat impregnated with resin. The assembly is then subjected to the same radiation, at the same distance and for the same time.

After removal from the mold, the four molded cups obtained showed an external surface of attractive appearance, which reproduced the finish of the glass cup which served as the mold.

The first molding showed a marked excess thickening in the base and a thinning further up the walls, the latter arising from the fact that the resin had run before polymerizing. The second molding has a uniform thickness, and a better transparency than the first. These two moldings exhibited a rough internal surface.

The third and fourth moldings each presented a smooth and glossy internal appearance, but that produced in the presence of water showed a better transparency and did not cause white glass fibers to appear, which fact corresponds to good glass-resin adhesion.

It will be obvious to those skilled in the art that various changes may be made without departing from the scope of the invention and the invention is not to be considered limited to what is described in the specification.

What is claimed is:

1. In a process for the photopolymerization of unsaturated polyester resins by exposing the said resins to light radia-tions in the presence of light-sensitive initiators, the improvement comprising:

putting the surface of said resin at least partly in direct contact with a liquid medium which is immiscible with said resin and transparent to the radiations which are appropriate to the initiator used, said liquid medium acting as a heat exchange medium; and carrying out the photopolymerization of said resin through said medium.

2. Process according to claim 1 in which the unsaturated polyester resin consists essentially of a polycondensate of unsaturated diacids or anhydrides with diols diluted with 20–70 percent by weight of a polymerizable ethylenic monomer.

3. Process according to claim 1 in which the liquid employed is water, a mineral or vegetable oil, or an organic solvent selected from the group consisting of methyl and ethyl alcohols, methylene chloride, carbon tetrachloride and monochlorobenzene.

* * * * *